(12) United States Patent
Makhal et al.

(10) Patent No.: US 11,685,605 B2
(45) Date of Patent: Jun. 27, 2023

(54) REINFORCEMENT LEARNING BASED CONVEYORING CONTROL

(71) Applicant: INTELLIGRATED HEADQUARTERS, LLC, Mason, OH (US)

(72) Inventors: Abhijit Makhal, Maryland Heights, MO (US); Dikshya Swain, St. Louis, MO (US); Sagar Lakhmani, St. Louis, MO (US)

(73) Assignee: Intelligrated Headquarters, LLC, Mason, OH (US)

( * ) Notice: Subject to any disclaimer, the term of this patent is extended or adjusted under 35 U.S.C. 154(b) by 420 days.

(21) Appl. No.: 16/874,401

(22) Filed: May 14, 2020

(65) Prior Publication Data

US 2021/0354926 A1 Nov. 18, 2021

(51) Int. Cl.
*B65G 15/00* (2006.01)
*B65G 43/10* (2006.01)
*B65G 43/08* (2006.01)
*G06N 20/00* (2019.01)
*G06N 3/02* (2006.01)
*G01B 11/26* (2006.01)
*G05B 13/02* (2006.01)

(52) U.S. Cl.
CPC .............. *B65G 15/00* (2013.01); *G01B 11/26* (2013.01); *G05B 13/027* (2013.01); *B65G 2201/02* (2013.01); *B65G 2203/0225* (2013.01); *B65G 2203/0291* (2013.01); *B65G 2203/041* (2013.01); *B65G 2811/095* (2013.01)

(58) Field of Classification Search
None
See application file for complete search history.

(56) References Cited

U.S. PATENT DOCUMENTS

| 3,109,529 | A | 11/1963 | Carter |
| 9,478,030 | B1 * | 10/2016 | Lecky ..................... G06V 20/64 |
| 10,504,020 | B2 * | 12/2019 | Trenholm ................. G06F 8/30 |
| 10,710,119 | B2 * | 7/2020 | Kumar ...................... G06N 3/08 |
| 11,127,283 | B2 * | 9/2021 | Ness ........................ G06T 7/292 |
| 2017/0140270 | A1 | 5/2017 | Mnih et al. |
| 2017/0161603 | A1 * | 6/2017 | Okanohara .............. G06N 3/08 |

(Continued)

OTHER PUBLICATIONS

Extended European Search Report issued in European Application No. 21171055.3 dated Oct. 20, 2021, 9 pages.

(Continued)

*Primary Examiner* — Kavel Singh
(74) *Attorney, Agent, or Firm* — Alston & Bird LLP

(57) ABSTRACT

Various embodiments described herein relate to techniques for reinforcement learning based conveyoring control. In this regard, a conveyor system is configured to transport one or more objects via a conveyor belt. Furthermore, a vision system comprises one or more sensors configured to scan the one or more objects associated with the conveyor system. A processing device is configured to employ a machine learning model to determine object pose data associated with the one or more objects. The processing device is further configured to generate speed control data for the conveyor belt of the conveyor system based on a set of control policies associated with the object pose data.

20 Claims, 8 Drawing Sheets

(56) References Cited

U.S. PATENT DOCUMENTS

2019/0056718 A1   2/2019   Satou

OTHER PUBLICATIONS

Jaensch, Florian et al. "Reinforcement Learning of Material Flow Control Logic Using Hardware-in-the-Loop Simulation." 2018 First International Conference on Artificial Intelligence for Industries (AI4I) (2018): 77-80.
Xiang, et al. "PoseCNN: A Convolutional Neural Network for 6D Object Pose Estimation in Cluttered Scenes," ARXIV.orf, Cornell University Library, 2017 (10 pages).

* cited by examiner

REINFORCEMENT LEARNING BASED CONVEYORING CONTROL

TECHNICAL FIELD

The present disclosure relates generally to robotics systems, and more particularly to robotic conveyor systems.

BACKGROUND

In a robotic conveyor system, a conveyor belt is generally controlled by a programmable logic unit where speed of the conveyor belt is fixed for providing smooth flow of an object (e.g., a package, a parcel, a box, a case, a carton, a pallet, etc.) along the conveyor belt. In certain robotic conveyor systems, different portions of a robotic conveyor system can include conveyor belts with different speeds. In other robotic conveyor systems, speed of a conveyor belt may be variable based on position of objects along the conveyor belt. However, conveyor systems are prone to inefficiencies. For example, an abundance of objects on a conveyor belt can result in decreased performance for a conveyor system, such as a jam causing delay of transportation of objects along the conveyor belt.

BRIEF SUMMARY

In accordance with an embodiment of the present disclosure, a system comprises a conveyor system, a vision system and a processing device. The conveyor system is configured to transport one or more objects via a conveyor belt. The vision system includes one or more sensors configured to scan the one or more objects associated with the conveyor system. The processing device is configured to employ a machine learning model to determine object pose data associated with the one or more objects. The processing device is further configured to generate speed control data for the conveyor belt of the conveyor system based on a set of control policies associated with the object pose data.

In accordance with another embodiment of the present disclosure, a computer-implemented method is provided. The computer-implemented method provides for receiving, by a device comprising a processor, sensor data associated with one or more objects transported via a conveyor belt of a conveyor system. The computer-implemented method also provides for determining, by the device, object pose data associated with the one or more objects by employing a machine learning model that infers the object pose data based on the sensor data. Furthermore, the computer-implemented method provides for generating, by the device, speed control data for the conveyor belt of the conveyor system based on a set of control policies associated with the object pose data.

In accordance with yet another embodiment of the present disclosure, a computer program product is provided. The computer program product comprises at least one computer-readable storage medium having program instructions embodied thereon, the program instructions executable by a processor to cause the processor to receive sensor data associated with one or more objects transported via a conveyor belt of a conveyor system. The program instructions are also executable by the processor to cause the processor to determine object pose data associated with the one or more objects by employing a machine learning model that infers the object pose data based on the sensor data. Furthermore, the program instructions are executable by the processor to cause the processor to generate speed control data for the conveyor belt of the conveyor system based on a set of control policies associated with the object pose data.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
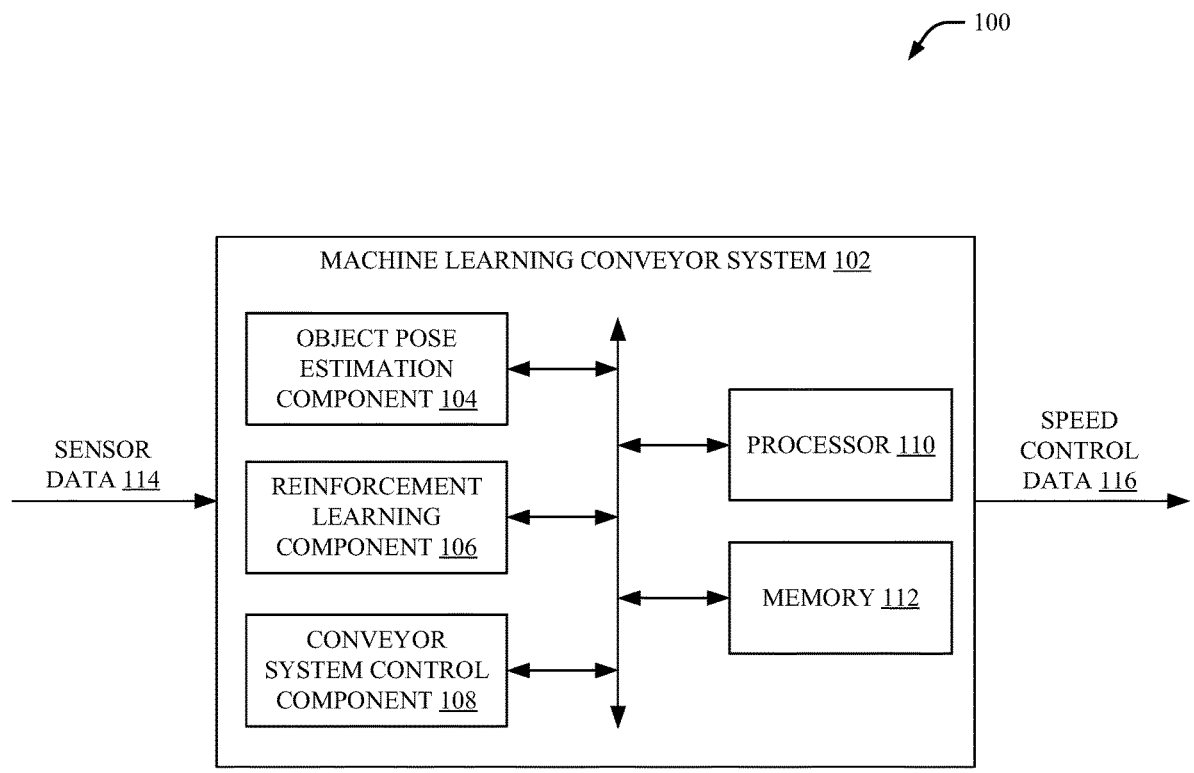
FIG. 1 illustrates a machine learning conveyor system, in accordance with one or more embodiments described herein.

Various embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

In material handling environments (e.g., distribution centers, shipping centers, warehouses, factories, etc.), it is often desirable to transport objects (e.g., packages, parcels, boxes, cases, cartons, pallets, etc.) along a conveyor belt of a conveyor system. A conveyor system is a robotic system that controls conveyor belts for transportation and/or singulation of objects. Generally, a conveyor belt is controlled by a programmable logic unit where speed of the conveyor belt is fixed for providing smooth flow of objects along the conveyor belt. In certain conveyor systems, different portions of a conveyor system can include conveyor belts with different speeds. In other conveyor systems, speed of a conveyor belt may be variable based on position of objects along the conveyor belt. For instance, a speed of a conveyor belt can be variable where positions of objects are determined by data provided by a vision system integrated in a conveyor system.

However, conveyor systems are prone to inefficiencies. With an example conveyor system, numerous objects can be provided to a conveyor belt of a conveyor system via a chute associated with singulation and/or actuators of the conveyor system (e.g., objects can be picked or swept by actuators of a conveyor system). In certain instances, an abundance of objects on the conveyor belt can result in a jam on the conveyor belt (e.g., an excess quantity of objects at a particular location on the conveyor belt) that results in a delay of transportation of the objects along the conveyor belt and/or a delay in unloading the objects from the conveyor belt. Furthermore, in certain instances, accuracy and/or efficiency of a conveyor screening process associated with a vision system of the conveyor system for identifying objects can be reduced as a result of the excess quantity of objects at the particular location on the conveyor belt.

Thus, to address these and/or other issues, reinforcement learning based conveyoring control is disclosed herein. The reinforcement learning based conveyoring control disclosed herein can be employed, for example, to provide an improved conveyor system with improved performance, improved efficiency, improved flow of objects, and/or improved singulation of objects is provided. In an embodiment, control of a speed of a conveyor belt for a conveyor system can be improved via machine learning. For instance, training can by employed to control a conveyor belt and machine learning can be employed to clear a jam associated with a conveyor system. In an aspect, a learned agent that is trained based on one or more machine learning techniques can be implemented to control one or more portions of the conveyor system. For instance, the learned agent can provide one or more control signals determined based on one or more machine learning techniques to control a speed of a conveyor belt for the conveyor system and/or a direction of a conveyor belt for the conveyor system. In certain embodiments, multiple learned agents can be employed during simulation to train with domain randomization in order to minimize differences between real data and simulated data. The domain randomization can enable training in simulation and/or execution during real-time operation of a conveyor system.

In certain embodiments, simulation associated with multiple conveyor systems can be employed to train and/or gather data to train one or more reinforcement learning agents for a conveyor system. The training process can also employ domain randomization in certain embodiments to minimize differences between real data and simulated data. In an embodiment, multiple conveyor system can be utilized in parallel (e.g., at approximately the same time) to train two different machine learning models. For instance, different learned agents can be trained in parallel. The two different machine learning models can be dependent on one another. For example, a first machine learning model can learn one or more control policies for optimal belt speed of a conveyor belt using reinforcement learning. Additionally or alternatively, the first machine learning model can learn one or more control policies for jam recovery (e.g., to mitigate a jam condition) associated with a conveyor system. Furthermore, a second machine learning model can employ a convolutional neural network to learn object poses from data captured by a vision system of the conveyor system. The object poses can include, for example, translations and/or rotations for an object.

In another embodiment, the first machine learning model associated with reinforcement learning and the second machine learning model associated with the convolutional neural network can be employed to facilitate control of a conveyor system. In an implementation, a vision system (e.g., a two-dimensional (2D) vision sensor and/or a three-dimensional (3D) vision sensor) of a conveyor system can scan a conveyor belt for one or more objects. In certain embodiments, an imaging device (e.g., an RGB image sensor) of the vision system can capture one or more RGB images associated with the conveyor belt. Data captured by the conveyor system can then be provided to the second machine learning model associated with the convolutional neural network to determine object pose data (e.g., a position and/or an orientation) for the one or more objects. Based on the object pose data, the first machine learning model associated with the reinforcement learning can employ the one or more control policies to determine speed control data related to a belt speed control of the conveyor belt of the conveyor system. In certain embodiments, the speed control data can control one or more actuators of the conveyor belt.

In yet another embodiment, a reinforcement learning process can be employed to learn one or more control policies related to a speed of a conveyor belt for the conveyor system and/or a direction of a conveyor belt for the conveyor system. In certain embodiments, the reinforcement learning process can be employed to initially learn one or more control policies related to conveyoring of a conveyor belt for the conveyor system. Additionally, at a later stage after the one or more control policies related to the conveyoring is learned, the one or more control policies can be employed to clear a jam associated with a conveyor belt of the conveyor system. As such, the reinforcement learning based conveyoring control disclosed herein can employ the reinforcement learning process to evolve to a control policy for jam recovery based on the one or more control policies related to the conveyoring.

In certain embodiments, a simulation-to-real architecture can employ simulation data and/or real data to facilitate the reinforcement learning process. In an aspect, the simulation-to-real architecture can employ domain randomization while training in simulation. In an embodiment, multiple worker systems (e.g., multiple instances of the same simulation of a conveyor system) can be implemented in parallel with one or more aspects of simulation being different between the multiple workers. For example, for different simulations of a conveyor system, color of objects (e.g., boxes) transported via a conveyor belt can be different. In another example, depth noise can be altered (e.g., increased) for different simulations of a conveyor system. In certain embodiments, both simulated data and real data can be employed for a training process for a conveyor system, where an amount of simulated data employed by the training process for a conveyor system is greater than an amount of real data employed by the training process to minimize overfitting to only simulated data.

As such, an improved conveyor system with improved performance, improved efficiency, improved flow of objects, and/or improved singulation of objects can be provided.

FIG. 1 illustrates a system 100 that provides an exemplary environment within which one or more described features of one or more embodiments of the disclosure can be implemented. According to an embodiment, the system 100 includes a machine learning conveyor system 102 to facilitate a practical application of reinforcement learning based conveyoring control for a conveyor system. In an embodiment, the machine learning conveyor system 102 can be a processing device that provides reinforcement learning based conveyoring control for a conveyor system. In a non-limiting embodiment, the machine learning conveyor system 102 can be a learned agent device for a conveyor system. The machine learning conveyor system 102 can be related to one or more technologies to facilitate reinforcement learning based conveyoring control for a conveyor system. Moreover, the machine learning conveyor system 102 can provide an improvement to one or more technologies such as conveyor system technologies, conveyor belt technologies, actuator technologies, robotics technologies, material handling technologies, sortation system technologies, imaging technologies, scanning technologies, digital technologies and/or other technologies. In an implementation, the machine learning conveyor system 102 can improve performance of a conveyor system. For example, the machine learning conveyor system 102 can provide improved efficiency, improved flow of objects, and/or improved singulation of objects for a conveyor system, as compared to conventional conveyor systems.

The machine learning conveyor system 102 can include an object pose estimation component 104, a reinforcement learning component 106 and/or a conveyor system control component 108. Additionally, in certain embodiments, the machine learning conveyor system 102 can include a processor 110 and/or a memory 112. In an alternate embodiment, the conveyor system control component 108 can be implemented separate from the machine learning conveyor system 102 (e.g., the conveyor system control component 108 can be implemented within a conveyoring control device and/or a conveyoring system). In certain embodiments, one or more aspects of the machine learning conveyor system 102 (and/or other systems, apparatuses and/or processes disclosed herein) can constitute executable instructions embodied within a computer-readable storage medium (e.g., the memory 112). For instance, in an embodiment, the memory 112 can store computer executable component and/or executable instructions (e.g., program instructions). Furthermore, the processor 110 can facilitate execution of the computer executable components and/or the executable instructions (e.g., the program instructions). In an example embodiment, the processor 110 can be configured to execute instructions stored in the memory 112 or otherwise accessible to the processor 110.

The processor 110 can be a hardware entity (e.g., physically embodied in circuitry) capable of performing operations according to one or more embodiments of the disclosure. Alternatively, in an embodiment where the processor 110 is embodied as an executor of software instructions, the software instructions can configure the processor 110 to perform one or more algorithms and/or operations described herein in response to the software instructions being executed. In an embodiment, the processor 110 can be a single core processor, a multi-core processor, multiple processors internal to the machine learning conveyor system 102, a remote processor (e.g., a processor implemented on a server), and/or a virtual machine. In certain embodiments, the processor 110 be in communication with the memory 112, the object pose estimation component 104, the reinforcement learning component 106 and/or the conveyor system control component 108 via a bus to, for example, facilitate transmission of data among the processor 110, the memory 112, the object pose estimation component 104, the reinforcement learning component 106 and/or the conveyor system control component 108. The processor 110 can be embodied in a number of different ways and can, in certain embodiments, include one or more processing devices configured to perform independently. Additionally or alternatively, the processor 110 can include one or more processors configured in tandem via a bus to enable independent execution of instructions, pipelining of data, and/or multi-thread execution of instructions. The memory 112 can be non-transitory and can include, for example, one or more volatile memories and/or one or more non-volatile memories. In other words, for example, the memory 112 can be an electronic storage device (e.g., a computer-readable storage medium). The memory 112 can be configured to store information, data, content, one or more applications, one or more instructions, or the like, to enable the machine learning conveyor system 102 to carry out various functions in accordance with one or more embodiments disclosed herein. As used herein in this disclosure, the term "component," "system," and the like, can be and/or can include a computer-related entity. For instance, "a component," "a system," and the like disclosed herein can be either hardware, software, or a combination of hardware and software. As an example, a component can be, but is not limited to, a process executed on a processor, a processor, circuitry, an executable component, a thread of instructions, a program, and/or a computer entity.

The machine learning conveyor system 102 (e.g., the object pose estimation component 104 of the machine learning conveyor system 102) can receive sensor data 114. The sensor data 114 can include one or more images (e.g., one or more 2D images and/or one or more 3D images) associated with one or more objects. Additionally or alternatively, the sensor data 114 can include 3D point cloud data associated with one or more objects. In an embodiment, the sensor data 114 can be captured by a vision system that scan one or more conveyor belts and/or one or more conveyor systems. The one or more objects can be one or more physical items, one or more elements, one or more devices, or the like that is transported via a conveyor belt of a conveyor system. For example, the one or more objects can be one or more packages, one or more parcels, one or more boxes, one or more cases, one or more cartons, one or more pallets and/or one or more other objects transported via a conveyor belt of a conveyor system in a material handling environment (e.g., a distribution center, a shipping center, a warehouse, a factory, etc.). In certain embodiments, the one or more objects can be one or more dynamic objects with a location that is not fixed. For example, the one or more objects can be shipped-in, shipped-out, or otherwise moved via a conveyor belt of a conveyor system. An object from the one or more objects can comprise a certain size, a certain shape, a certain color, and/or another physical characteristic. An object from the one or more objects can also comprise a certain position with respect to a conveyor belt and/or a certain orientation with respect to a conveyor belt. For example, an object from the one or more objects can comprise an x-axis position value Tx, a y-axis position value Ty, a z-axis position value Tz and/or a rotation value Rz.

In an embodiment, the sensor data 114 can be imaging data that includes a plurality of pixels for the one or more images. For example, each pixel in the plurality of pixels can represent a point in a scene related to an object. In an aspect, each pixel in the plurality of pixels can include color data, intensity data and/or depth data. The color data can be represented in the form of one or more color schemes such as, but not limited to, a RGB color scheme, a CMYK color scheme, a monochrome color scheme, a grayscale color scheme, and/or the another type of color scheme. The intensity data can be representative of a brightness associated with each pixel. The depth data can correspond to a distance of a respective point, represented by a respective pixel, from the vision system that captures the one or more images. In an example embodiment, the one or more images of the sensor data 114 can be encoded and/or represented in one or more formats such as JPEG, Bitmap, PNG, RAW, and/or another type of format.

The object pose estimation component 104 can determine object pose data for the one or more objects related to the sensor data 114. In an embodiment, the object pose estimation component 104 can employ a machine learning model to determine the object pose data based on the one or more images included in the sensor data 114. In an aspect, the machine learning model employed by the object pose estimation component 104 can be a machine learning model that is trained for object pose estimation. In another aspect, the one or more images associated with the sensor data 114 can be provided as input to the machine learning model associated with object pose estimation. In an embodiment, the machine learning model can be a convolutional neural network that is trained to identify object poses from images. For instance, in an embodiment, the convolutional neural network can be a deep neural network that is trained to analyze visual imagery based on a shared-weights architecture and/or translation invariance characteristics between a series of convolutional layers, one or more pooling layers, one or more fully connected layers and/or one or more normalization layers.

In an embodiment, the object pose data can include position data for the one or more objects related to the sensor data 114. For example, the object pose estimation component 104 can employ the machine learning model associated with object pose estimation to determine the position data (e.g., the position data for the one or more objects related to the sensor data 114) based on the one or more images included in the sensor data 114. The position data can be, for example, translation data that includes an x-axis position value Tx, a y-axis position value Ty, and/or a z-axis position value Tz for each object from the one or more objects related to the sensor data 114.

In another embodiment, the object pose data can additionally or alternatively include orientation data for the one or more objects related to the sensor data 114. For example, the object pose estimation component 104 can employ the machine learning model associated with object pose estimation to determine the orientation data (e.g., the orientation data for the one or more objects related to the sensor data 114) based on the one or more images included in the sensor data 114. The orientation data can, for example, an orientation value Rz for each object from the one or more objects related to the sensor data 114.

The reinforcement learning component 106 can employ a set of control policies to generate speed control data 116 for the conveyor belt of the conveyor system based on the object pose data. For example, the reinforcement learning component 106 can employ a set of control policies to generate the speed control data 116 for the conveyor belt of the conveyor system based on the position data and/or the orientation data. In certain embodiments, the speed control data 116 can include a value to increase or decrease a current speed of the conveyor belt of the conveyor system. For example, the speed control data 116 can include a certain positive value to increase a speed of the conveyor belt of the conveyor system by a certain amount. In another example, the speed control data 116 can include a certain negative value to decrease a speed of the conveyor belt of the conveyor system by a certain amount. Additionally or alternatively, in certain embodiments, the speed control data 116 can include a value to control a direction of the conveyor belt of the conveyor system. For example, the speed control data 116 can include a certain value (e.g., a first binary value) to control direction of the conveyor belt of the conveyor system in a forward direction. In another example, the speed control data 116 can include another value (e.g., a second binary value) to control direction of the conveyor belt of the conveyor system in a backward direction. The set of control policies can be one or more control policies generated for the conveyor belt of the conveyor system based on reinforcement learning. The set of control policies can determine speed and/or direction for control of the conveyor belt of the conveyor system. For example, the set of control policies can be one or more control policies to provide an optimal belt speed for the conveyor belt of the conveyor system. The set of control policies can include one or more rules and/or one or more actions to facilitate an optimal belt speed for the conveyor belt of the conveyor system and/or mitigation of a jam condition associated with the conveyor belt of the conveyor system. The one or more rules and/or the one or more actions can be related to movement of the one or more objects from a certain area of the conveyor belt and/or the conveyor belt system. Additionally or alternatively, the one or more rules and/or the one or more actions can be related to a certain degree of forward movement or a certain degree of backward movement for the one or more objects with respect to the conveyor belt and/or the conveyor belt system. Additionally or alternatively, the one or more rules and/or the one or more actions can be related to a path of motion for the one or more objects with respect to the conveyor belt and/or the conveyor belt system. Furthermore, a machine learning model trained via a reinforcement learning process can generate the set of control policies. The reinforcement learning process can be related to simulation associated with a plurality of conveyor systems in order to determine an optimal belt speed for the conveyor belt of the conveyor system. In an embodiment, the reinforcement learning component 106 can employ the machine learning model to determine the speed control data 116 for the conveyor belt of the conveyor system based on one or more control policies from the set of control policies that are related to the object pose data. The speed control data 116 can be, for example, one or more belt speeds for the conveyor belt of the conveyor system.

The conveyor system control component 108 can generate one or more control signals for the conveyor system based on the speed control data 116. For example, the conveyor system control component 108 can generate one or more control signals for the conveyor belt of the conveyor system based on the speed control data 116. In certain embodiments, the conveyor system control component 108 can generate one or more control signals for one or more actuators of the conveyor system based on the speed control data 116. In certain embodiments, the conveyor system control component 108 can modify one or more settings of the conveyor belt of the conveyor system based on the speed control data 116. The conveyor system control component 108 can generate the one or more control signals for the conveyor system to facilitate, for example jam recovery and/or improved flow of objects associated with the conveyor belt of the conveyor system. As such, the machine learning conveyor system 102 can provide the speed control data 116 and/or the one or more control signals associated with the speed control data to the conveyor system to improve performance of the conveyor system, to improve efficiency of the conveyor system, to improve flow of objects transported via the conveyor belt of the conveyor system, and/or to improve singulation of objects transported via the conveyor belt of the conveyor system.

Figure 2:
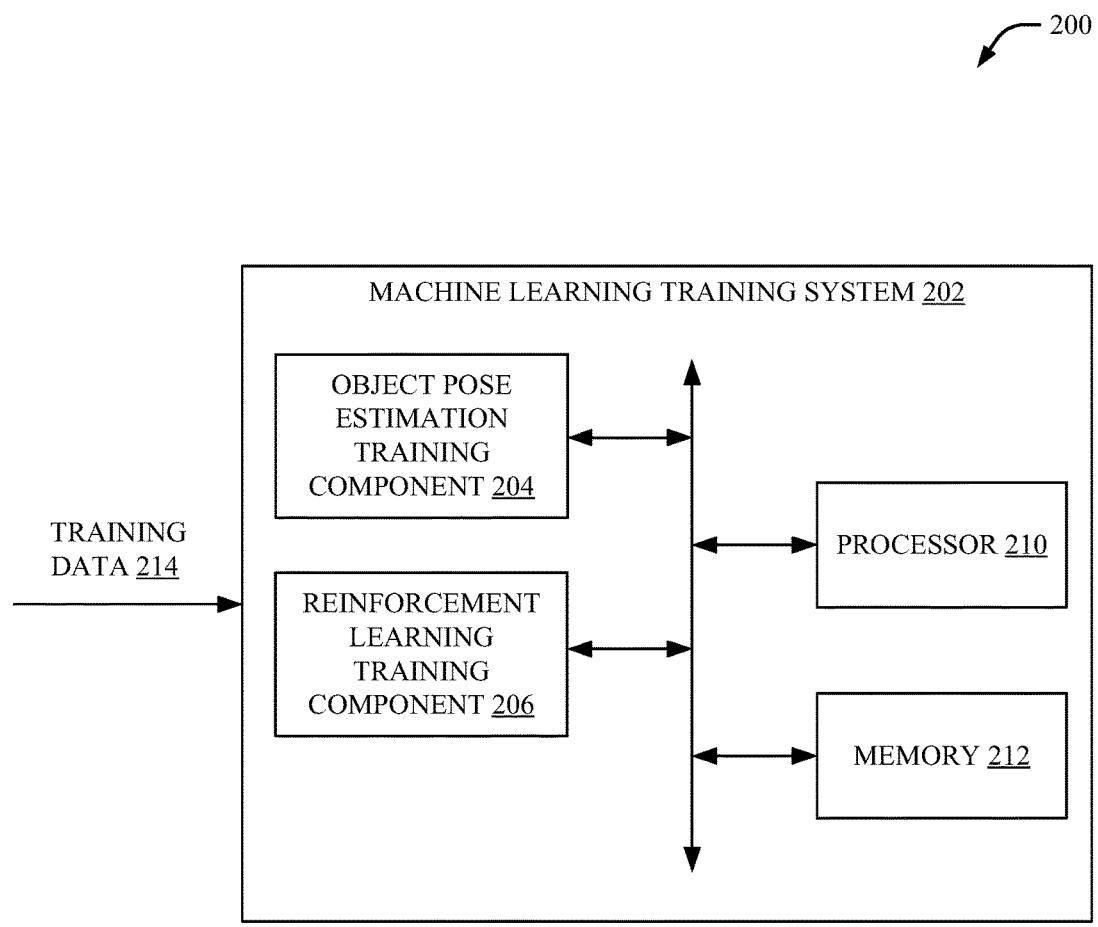
FIG. 2 illustrates a machine learning training system, in accordance with one or more embodiments described herein.

FIG. 2 illustrates a system 200 that provides an exemplary environment within which one or more described features of one or more embodiments of the disclosure can be implemented. According to an embodiment, the system 200 includes a machine learning training system 202 to facilitate a practical application of training one or more machine learning models for reinforcement learning based conveyoring control of a conveyor system. The machine learning training system 202 can be related to one or more technologies to facilitate reinforcement learning based conveyoring control for a conveyor system. Moreover, the machine learning training system 202 can provide an improvement to one or more technologies such as conveyor system technologies, conveyor belt technologies, actuator technologies, robotics technologies, material handling technologies, sortation system technologies, imaging technologies, scanning technologies, digital technologies, machine learning technologies, and/or other technologies. In an implementation, the machine learning training system 202 can facilitate generation of one or more improved machine learning models for reinforcement learning based conveyoring control of a conveyor system.

The machine learning training system 202 can include an object pose estimation training component 204 and/or a reinforcement learning training component 206. Additionally, in certain embodiments, the machine learning training system 202 can include a processor 210 and/or a memory 212. In certain embodiments, one or more aspects of the machine learning training system 202 (and/or other systems, apparatuses and/or processes disclosed herein) can constitute executable instructions embodied within a computer-readable storage medium (e.g., the memory 212). For instance, in an embodiment, the memory 212 can store computer executable component and/or executable instructions (e.g., program instructions). Furthermore, the processor 210 can facilitate execution of the computer executable components and/or the executable instructions (e.g., the program instructions). In an example embodiment, the processor 210 can be configured to execute instructions stored in the memory 212 or otherwise accessible to the processor 210.

The processor 210 can be a hardware entity (e.g., physically embodied in circuitry) capable of performing operations according to one or more embodiments of the disclosure. Alternatively, in an embodiment where the processor 210 is embodied as an executor of software instructions, the software instructions can configure the processor 210 to perform one or more algorithms and/or operations described herein in response to the software instructions being executed. In an embodiment, the processor 210 can be a single core processor, a multi-core processor, multiple processors internal to the machine learning training system 202, a remote processor (e.g., a processor implemented on a server), and/or a virtual machine. In certain embodiments, the processor 210 be in communication with the memory 212, the object pose estimation training component 204, and/or the reinforcement learning training component 206 via a bus to, for example, facilitate transmission of data among the processor 210, the memory 212, the object pose estimation training component 204, and/or the reinforcement learning training component 206. The processor 210 can be embodied in a number of different ways and can, in certain embodiments, include one or more processing devices configured to perform independently. Additionally or alternatively, the processor 210 can include one or more processors configured in tandem via a bus to enable independent execution of instructions, pipelining of data, and/or multi-thread execution of instructions. The memory 212 can be non-transitory and can include, for example, one or more volatile memories and/or one or more non-volatile memories. In other words, for example, the memory 212 can be an electronic storage device (e.g., a computer-readable storage medium). The memory 212 can be configured to store information, data, content, one or more applications, one or more instructions, or the like, to enable the machine learning training system 202 to carry out various functions in accordance with one or more embodiments disclosed herein. As used herein in this disclosure, the term "component," "system," and the like, can be and/or can include a computer-related entity. For instance, "a component," "a system," and the like disclosed herein can be either hardware, software, or a combination of hardware and software. As an example, a component can be, but is not limited to, a process executed on a processor, a processor, circuitry, an executable component, a thread of instructions, a program, and/or a computer entity.

The machine learning training system 202 (e.g., the object pose estimation training component 204 of the machine learning training system 202) can receive training data 214. The training data 214 can include one or more images (e.g., one or more 2D images and/or one or more 3D images) associated with one or more objects to facilitate training of a machine learning model for object pose estimation. In an embodiment, the training data 214 can be captured by a vision system that scan one or more conveyor belts and/or one or more conveyor systems. The one or more objects can be one or more physical items, one or more elements, one or more devices, or the like that is transported via a conveyor belt of a conveyor system. For example, the one or more objects can be one or more packages, one or more parcels, one or more boxes, one or more cases, one or more cartons, one or more pallets and/or one or more other objects transported via a conveyor belt of a conveyor system in a material handling environment (e.g., a distribution center, a shipping center, a warehouse, a factory, etc.). In certain embodiments, the one or more objects can be one or more dynamic objects with a location that is not fixed. For example, the one or more objects can be shipped-in, shipped-out, or otherwise moved via a conveyor belt of a conveyor system. An object from the one or more objects can comprise a certain size, a certain shape, a certain color, and/or another physical characteristic. An object from the one or more objects can also comprise a certain position with respect to a conveyor belt and/or a certain orientation with respect to a conveyor belt. For example, an object from the one or more objects can comprise an x-axis position value Tx, a y-axis position value Ty, a z-axis position value Tz and/or a rotation value Rz.

In an aspect, the training data 214 can be imaging data that includes a plurality of pixels for the one or more images. For example, each pixel in the plurality of pixels can represent a point in a scene related to an object. In an aspect, each pixel in the plurality of pixels can include color data, intensity data and/or depth data. The color data can be represented in the form of one or more color schemes such as, but not limited to, a RGB color scheme, a CMYK color scheme, a monochrome color scheme, a grayscale color scheme, and/or the another type of color scheme. The intensity data can be representative of a brightness associated with each pixel. The depth data can correspond to a distance of a respective point, represented by a respective pixel, from the vision system that captures the one or more images. In an example embodiment, the one or more images of the training data 214 can be encoded and/or represented in one or more formats such as JPEG, Bitmap, PNG, RAW, and/or another type of format.

The object pose estimation training component 204 can train a machine learning model associated with object pose estimation based on the training data 214. For instance, the machine learning model trained by the object pose estimation training component 204 can be a machine learning model that is trained for object pose estimation. In an aspect, sensor data (e.g., the one or more images) associated with the training data 214 can be provided as input to the machine learning model associated with object pose estimation. In an embodiment, the machine learning model can be a convolutional neural network that is trained based on the training data 214 collected from simulation to identify object poses. For instance, in an embodiment, the convolutional neural network can be a deep neural network that is trained based on the training data 214 to analyze visual imagery based on a shared-weights architecture and/or translation invariance characteristics between a series of convolutional layers, one or more pooling layers, one or more fully connected layers and/or one or more normalization layers. In certain embodiments, the object pose estimation training component 204 can employ the training data 214 to modify one or more weights and/or one or more parameters for one or more convolutional layers of the machine learning model associated with object pose estimation.

The reinforcement learning training component 206 can train a model (e.g., a machine learning model) to learn a set of control policies for optimal speed control of a conveyor belt based on object pose data. For example, the reinforcement learning training component 206 can train a model (e.g., a machine learning model) to learn a set of control policies for optimal speed control of a conveyor belt based on position data and/or orientation data for objects associated with the training data 214. The set of control policies can be one or more control policies generated for the conveyor belt of the conveyor system based on reinforcement learning. For example, the set of control policies can be one or more control policies to provide an optimal belt speed for the conveyor belt of the conveyor system. In certain embodiments, the reinforcement learning training component 206 can employ a reinforcement learning process related to simulation associated with a plurality of conveyor systems in order to determine the set of control policies for optimal speed control of a conveyor belt.

Figure 3:
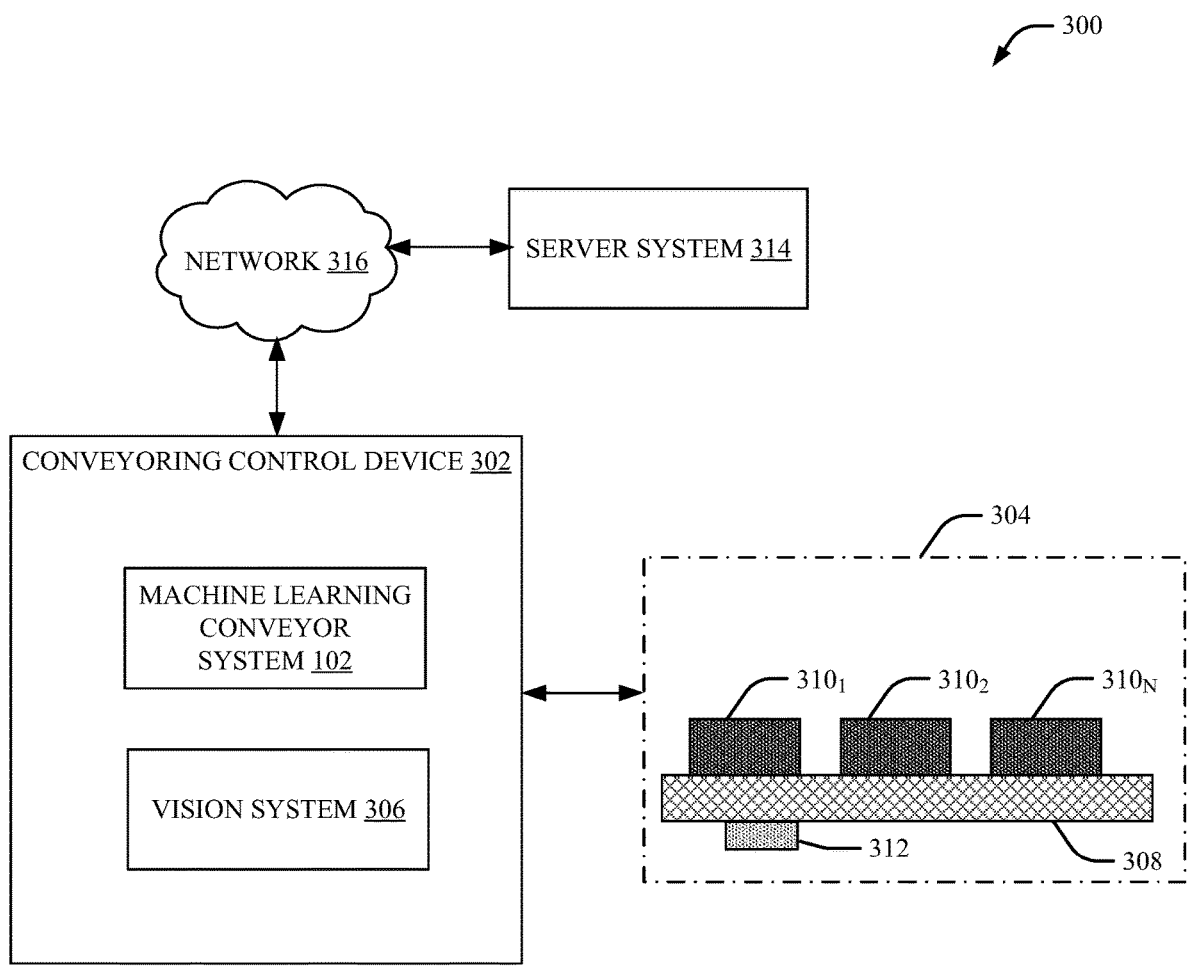
FIG. 3 illustrates a system associated with an exemplary environment that includes a conveyoring control device and a conveyor system, in accordance with one or more embodiments described herein.

FIG. 3 illustrates a system 300 that provides an exemplary environment within which one or more of the described features of one or more embodiments of the disclosure can be implemented. The system 300 includes a conveyoring control device 302 that determines speed control data (e.g., the speed control data 116) for a conveyor system 304. In an embodiment, the conveyoring control device 302 includes the machine learning conveyor system 102 and/or a vision system 306. Additionally, in an embodiment, the conveyor system 304 includes a conveyor belt 308 and one or more objects $310_{1-N}$, where N is an integer. The conveyor belt 308 can be a mechanism that transports, directs and/or routs the one or more objects $310_{1-N}$ through the conveyor system 304. The one or more objects $310_{1-N}$ can be, for example, one or more packages, one or more parcels, one or more boxes, one or more cases, one or more cartons, one or more pallets and/or one or more other objects. In an aspect, the conveyor belt 308 can be associated with a receiving lane of the conveyor system 304, an accumulation buffering lane of the conveyor system 304, a shipping lane of the conveyor system 304, or another lane of the conveyor system 304. In one embodiment, the conveyor belt 308 can be associated with a constant elevation. In another embodiment, the conveyor belt can be associated with a variable elevation (e.g., one or more elevation changes). The conveyor system 304 can be, for example, a case conveyor, a tote conveyor, a polybag conveyor, a transportation conveyor, a pallet conveyor, an accumulation conveyor, a vertical indexing conveyor, or another type of conveyor system. In certain embodiments, at least a portion of the conveyor system 304 can be a sortation system. For example, in certain embodiments, the conveyor system 304 can be a sweeper sorter, a strip-belt sorter, a cross-belt sorter, a tilt-tray sorter, a push-tray sorter, a sliding shoe sorter, a popup wheel sorter, a vertical sortation sorter, or another type of sorter system. In an embodiment, the conveyor system 304 can additionally include an actuator 312. The actuator 312 can be a device that converts rotary motion into linear motion for the conveyor belt 308. In one embodiment, the actuator 312 can be an electric linear actuator that employs a motor to control speed of the conveyor belt 308.

In an embodiment, the vision system 306 can scan the conveyor system 304 to generate the sensor data 114. For example, the vision system 306 can include one or more sensors configured to scan the conveyor belt 308 to generate one or more images associated with the one or more objects $310_{1-N}$. In an embodiment, the vision system 306 can include one or more imaging devices (e.g., one or more image capturing devices) such as one or more cameras (e.g., one or more camera units, one or more 2D cameras, one or more 3D cameras, etc.). For example, the vision system 306 can include one or more image sensors (e.g., one or more CMOS sensors, one or more CCD sensors, etc.) to facilitate generation of one or more images related to the one or more objects $310_{1-N}$. In certain embodiments, the vision system 306 can additionally or alternatively generate 3D point cloud data related to the one or more objects $310_{1-N}$. In certain embodiments, the vision system 306 can include an embedded processor (e.g., an embedded processor that is different than the processor 110 of the machine learning conveyor system 102) configured to control the vision system 306.

The machine learning conveyor system 102 can receive the sensor data 114 generated by the vision system 306.

Furthermore, the machine learning conveyor system 102 (e.g., the object pose estimation component 104, the reinforcement learning component 106 and/or the conveyor system control component 108) can employ the sensor data 114 to perform object pose estimation, reinforcement learning and/or conveyor system control for the conveyor belt 308 of the conveyor system 304. For example, based on the sensor data 114 generated by the vision system 306, the machine learning conveyor system 102 (e.g., the object pose estimation component 104, the reinforcement learning component 106 and/or the conveyor system control component 108) can generate the speed control data 116 for the conveyor belt 308 of the conveyor system 304. In certain embodiments, the speed control data 116 generated by the machine learning conveyor system 102 and/or one or more control signal associated with the speed control data 116 can be provided to the actuator 312 of the conveyor system 304 to control a speed of the conveyor belt 308 of the conveyor system 304. As such, conveyor system 304 can be provided with improved performance, improved efficiency, improved flow of the one or more objects $310_{1-N}$, and/or improved singulation of the one or more objects $310_{1-N}$.

In an alternate embodiment, at least a portion of the machine learning conveyor system 102 can be implemented on a server system 314. For example, in certain embodiments, the vision system 306 can transmit the sensor data 114 (e.g., processed sensor data) to at least a portion of the machine learning conveyor system 102 implemented on the server system 314 via a network 316. The network 316 can be a communications network that employs wireless technologies and/or wired technologies to transmit data between the vision system 306 and the server system 314. For example, the network 316 can be a Wi-Fi network, a Near Field Communications (NFC) network, a Worldwide Interoperability for Microwave Access (WiMAX) network, a personal area network (PAN), a short-range wireless network (e.g., a Bluetooth® network), an infrared wireless (e.g., IrDA) network, an ultra-wideband (UWB) network, an induction wireless transmission network, and/or another type of network.

Figure 4:
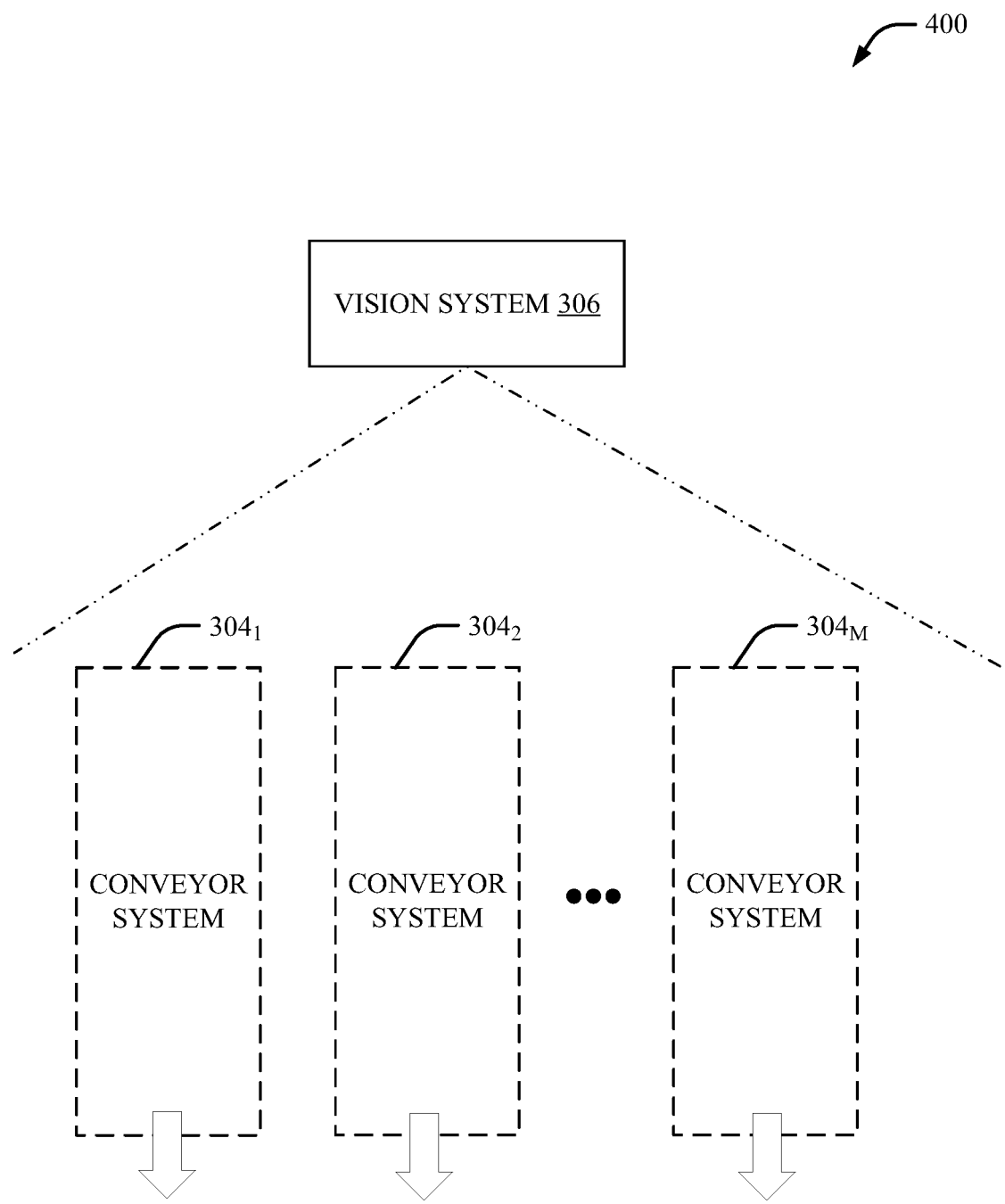
FIG. 4 illustrates a system associated with a vision system and a plurality of conveyor systems, in accordance with one or more embodiments described herein.

FIG. 4 illustrates a system 400 in accordance with one or more embodiments of the disclosure. The system 400 includes the vision system 306 and a plurality of conveyor systems $304_{1-M}$, where M is an integer. In an embodiment, the vision system 306 can scan plurality of conveyor systems $304_{1-M}$. For example, the vision system 306 can scan one or more first objects provided by a first conveyor belt of the conveyor system $304_1$, one or more second objects provided by a second conveyor belt of the conveyor system $304_2$, etc. In another embodiment, the machine learning conveyor system 102 can determine first object pose data for the one or more first objects provided by the first conveyor belt of the conveyor system $304_1$, second object pose data for the one or more second objects provided by the second conveyor belt of the conveyor system $304_2$, etc. For instance, in an embodiment, the vision system 306 can generate first image sensor data (e.g., one or more first images) for the one or more first objects provided by the first conveyor belt of the conveyor system $304_1$, second image sensor data (e.g., one or more second images) for the one or more second objects provided by the second conveyor belt of the conveyor system $304_2$, etc. Furthermore, the machine learning conveyor system 102 can perform respective object pose estimation, reinforcement learning, and/or conveyor system control for the plurality of conveyor systems $304_{1-M}$.

Figure 5:
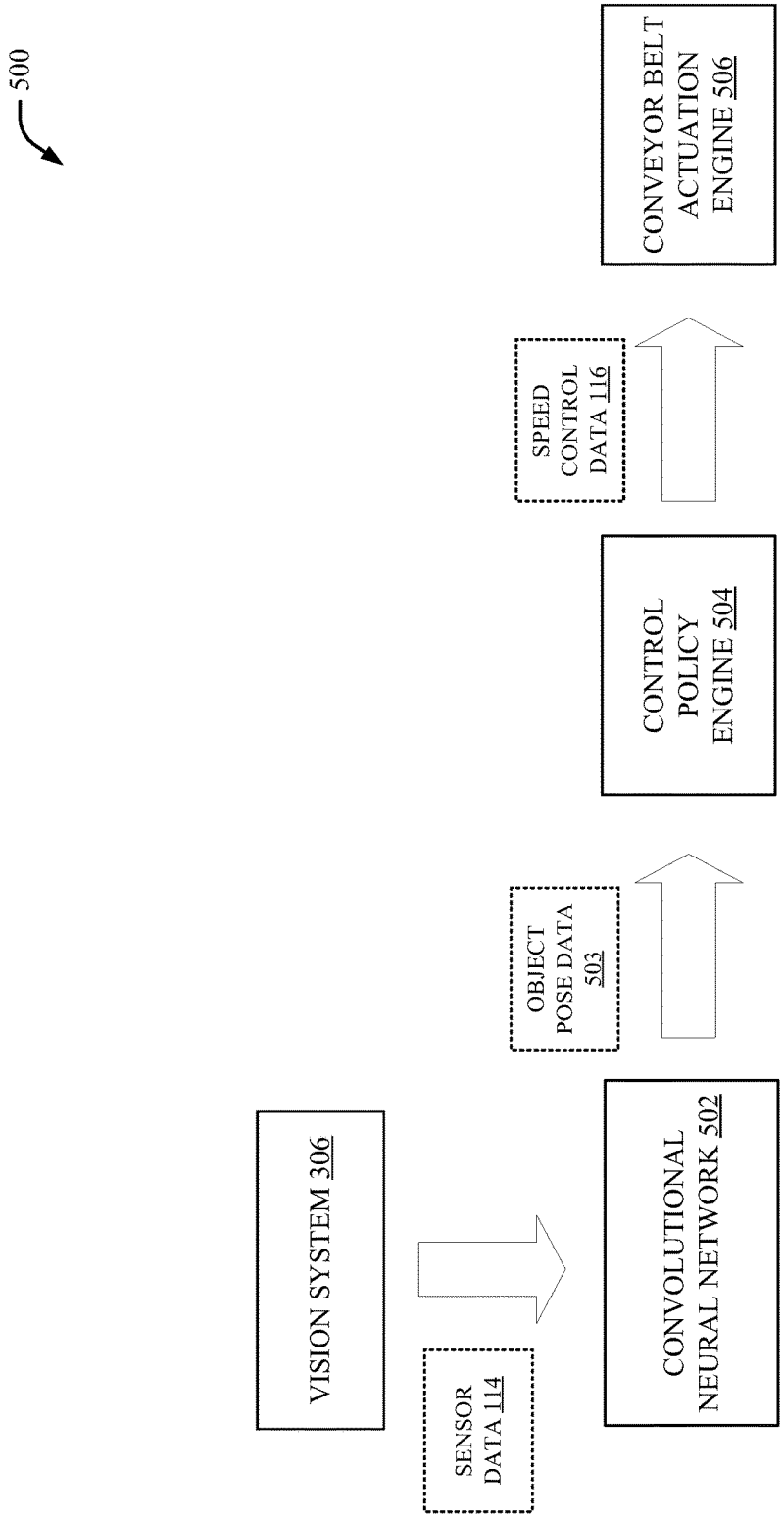
FIG. 5 illustrates a system associated with reinforcement learning based conveyoring control, in accordance with one or more embodiments described herein.

FIG. 5 illustrates a system 500 in accordance with one or more embodiments of the disclosure. The system 500 includes the vision system 306, a convolutional neural network 502, a control policy engine 504, and/or a conveyor belt actuation engine 506. In an embodiment, the vision system 306 provides the sensor data 114 as input to the convolutional neural network 502. In one example, the sensor data 114 can be formatted as one or more RGB images. In another example, the sensor data 114 can be formatted as 3D point cloud data. However, it is to be appreciated that the sensor data 114 can be a different type of imaging data. The convolutional neural network 502 can be trained for object pose estimation. For example, the convolutional neural network 502 can be trained to identify object poses from the sensor data 114. The convolutional neural network 502 can be a deep neural network that includes a series of convolutional layers, one or more pooling layers, one or more fully connected layers and/or one or more normalization layers to facilitate object pose estimation. In an aspect, the convolutional neural network 502 can determine one or more classifications, one or more correlations, one or more inferences, one or more patterns, one or more features and/or other information to facilitate object pose estimation and generation of object pose data 503 related to the sensor data 114.

In certain embodiments, processing by the convolutional neural network 502 can be associated with image recognition, image analysis, 3D point clouds, and/or computer vision to facilitate object pose estimation. In an aspect, the convolutional neural network 502 can determine position data and/or orientation data for one or more objects included in the sensor data 114 based on a coordinate system associated with x-axis coordinates, y-axis coordinates, and/or a z-axis coordinates of respective points in a scene of the conveyor system associated with the sensor data 114. For example, the convolutional neural network 502 can employ a mapping of two-dimensional features or three-dimensional features in a coordinate system to determine position data and/or orientation data for one or more objects included in the sensor data 114. In certain embodiments, the convolutional neural network 502 can employ one or more object segmentation mask to identify one or more geometric features of the one or more objects included in the sensor data 114. The geometric features can include, for example, corners of an object, edges of an object, portions of an object, interest points of an object, regions of interest points of an object, and/or another type of geometric feature of an object.

In an embodiment, the convolutional neural network 502 can generate object pose data 503 based on the sensor data 114. The object pose data 503 can include position data for the one or more objects related to the sensor data 114. For example, in an embodiment, the convolutional neural network 502 can determine the position data (e.g., the position data for the one or more objects related to the sensor data 114) based on one or more images included in the sensor data 114. In another embodiment, the convolutional neural network 502 can determine the position data (e.g., the position data for the one or more objects related to the sensor data 114) based on 3D point cloud data included in the sensor data 114. The position data included in the object pose data 503 can include an x-axis position value Tx, a y-axis position value Ty, and/or a z-axis position value Tz with respect to the coordinate system for each object from the one or more objects related to the sensor data 114. In another embodiment, the object pose data 503 can additionally or alternatively include orientation data for the one or more objects related to the sensor data 114. For example, in an embodiment, the convolutional neural network 502 can determine the orientation data (e.g., the orientation data for the one or more objects related to the sensor data 114) based on one or more images included in the sensor data 114. In another embodiment, the convolutional neural network 502 can determine the orientation data (e.g., the orientation data for the one or more objects related to the sensor data 114) based on 3D point cloud data included in the sensor data 114. The orientation data included in the object pose data 503 an orientation value Rz with respect to the coordinate system for each object from the one or more objects related to the sensor data 114.

The control policy engine 504 can determine the speed control data 116 based on the object pose data 503. In an embodiment, the control policy engine 504 can employ the set of control policies to select the speed control data 116 based on the object pose data 503. The set of control policies can be one or more policies to control the conveyor belt (e.g., control actuation of the conveyor belt) for optimal speed control of the conveyor belt. For instance, the control policy engine 504 can employ the object pose data 503 and the set of control policies to determine the speed control data 116 for the conveyor belt (e.g., an actuator that controls the conveyor belt). In one example, a control policy can be an action and/or a rule to facilitate an optimal belt speed for the conveyor belt of the conveyor system and/or mitigation of a jam condition associated with the conveyor belt of the conveyor system. Additionally or alternatively, a control policy can be related to movement of the one or more objects from a certain area of the conveyor belt and/or the conveyor belt system. Additionally or alternatively, a control policy can be related to a certain degree of forward movement or a certain degree of backward movement for the one or more objects with respect to the conveyor belt and/or the conveyor belt system. Additionally or alternatively, a control policy can be to a path of motion for the one or more objects with respect to the conveyor belt and/or the conveyor belt system.

The conveyor belt actuation engine 506 can apply the speed control data 116 to the conveyor belt of the conveyor system. For example, the conveyor belt actuation engine 506 can apply the speed control data 116 to an actuator that controls the conveyor belt of the conveyor system. In an embodiment, the conveyor belt actuation engine 506 can provide the speed control data 116 to the actuator via one or more control signals associated with the speed control data 116. In certain embodiments, the one or more control signals can include a value to increase or decrease a current speed of the conveyor belt of the conveyor system. For example, the one or more control signals can include a certain positive value to increase a speed of the conveyor belt of the conveyor system by a certain amount. In another example, the one or more control signals can include a certain negative value to decrease a speed of the conveyor belt of the conveyor system by a certain amount. Additionally or alternatively, the one or more control signals can include a value to control a direction of the conveyor belt of the conveyor system. For example, the one or more control signals can include a certain a certain value (e.g., a first binary value) to control direction of the conveyor belt of the conveyor system in a forward direction. In another example, the one or more control signals can include another value (e.g., a second binary value) to control direction of the conveyor belt of the conveyor system in a backward direction.

Figure 6:
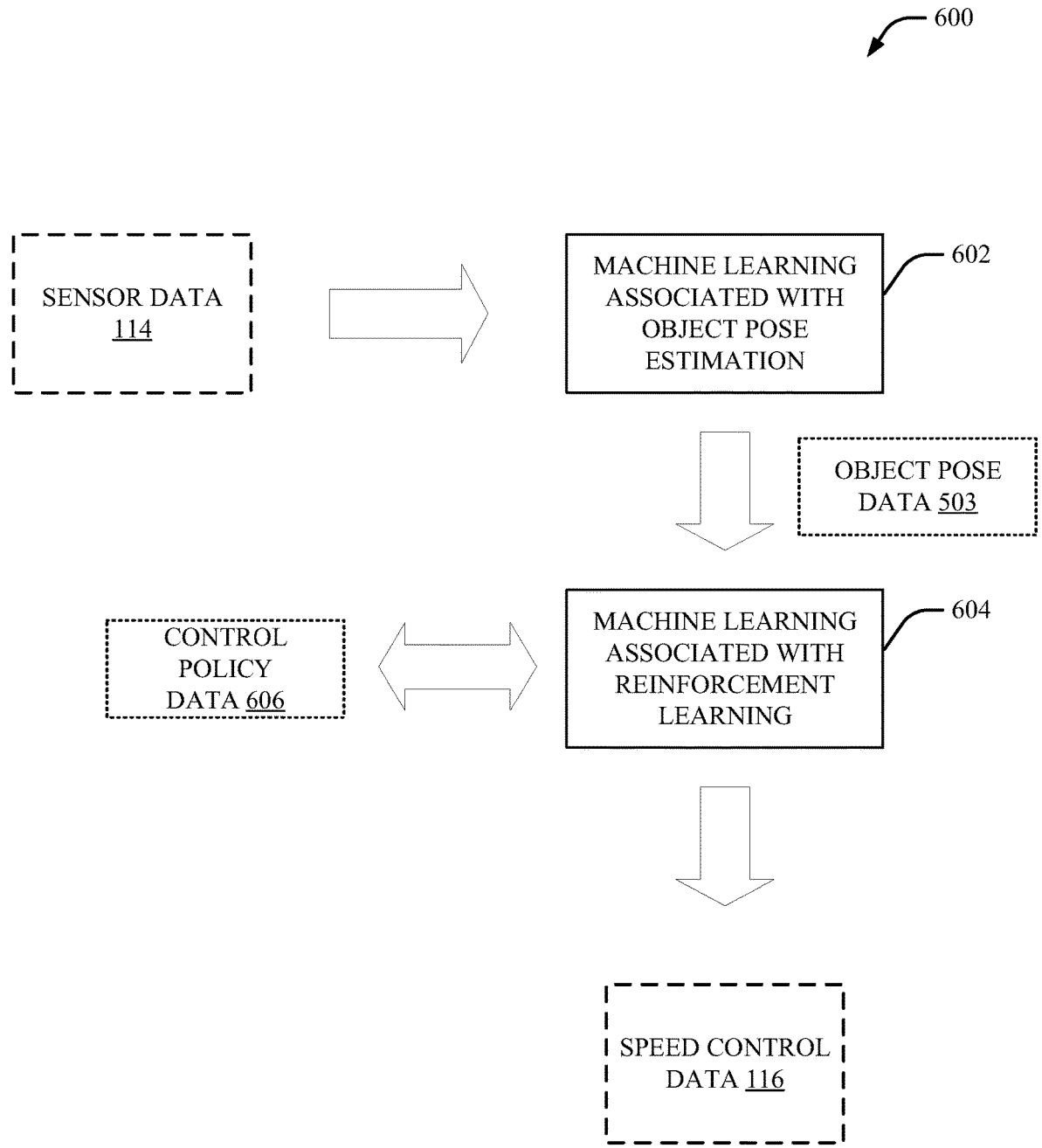
FIG. 6 illustrates another system associated with reinforcement learning based conveyoring control, in accordance with one or more embodiments described herein.

FIG. 6 illustrates a system 600 in accordance with one or more embodiments of the disclosure. The system 600 includes a process 602 for machine learning associated with object pose estimation. The system 600 also includes a process 604 for machine learning associated with reinforcement learning. In an embodiment, the process 602 can be a process performed by the object pose estimation component 104 and/or the convolutional neural network 502. Furthermore, the process 604 can be a process performed by the reinforcement learning component 106 and/or the control policy engine 504. The process 602 can perform the machine learning associated with object pose estimation based on the sensor data 114. In certain embodiments, the process 604 can employ image recognition associated with machine learning, image analysis associated with machine learning, and/or computer vision associated with machine learning to facilitate object pose estimation. In an aspect, the process 604 can perform the machine learning associated with object pose estimation to determine one or more classifications, one or more correlations, one or more inferences, one or more patterns, one or more features and/or other information related to geometric features of the one or more objects included in the sensor data 114. For example, the process 604 can perform the machine learning associated with object pose estimation to determine corners of the one or more objects included in the sensor data 114, edges of the one or more objects included in the sensor data 114, portions of the one or more objects included in the sensor data 114, interest points of the one or more objects included in the sensor data 114, regions of interest points of the one or more objects included in the sensor data 114, and/or another type of geometric feature of the one or more objects included in the sensor data 114. In another aspect, the process 604 can perform the machine learning associated with object pose estimation to determine the object pose data 503 based on the geometric features of the one or more objects included in the sensor data 114.

The process 604 can perform the machine learning associated with the reinforcement learning based on the object pose data 503 and/or control policy data 606. The control policy data 606 can include a set of control policies to provide an optimal belt speed associated with the speed control data 116. The control policy data 606 can be one or more control policies generated for the conveyor belt of the conveyor system based on the machine learning associated with reinforcement learning. For example, the control policy data 606 can include one or more rules and/or one or more actions to facilitate an optimal belt speed for the conveyor belt of the conveyor system and/or mitigation of a jam condition associated with the conveyor belt of the conveyor system. The one or more rules and/or the one or more actions included in the control policy data 606 can be related to movement of the one or more objects from a certain area of the conveyor belt and/or the conveyor belt system. Additionally or alternatively, the one or more rules and/or the one or more actions included in the control policy data 606 can be related to a certain degree of forward movement or a certain degree of backward movement for the one or more objects with respect to the conveyor belt and/or the conveyor belt system. Additionally or alternatively, the one or more rules and/or the one or more actions included in the control policy data 606 can be related to a path of motion for the one or more objects with respect to the conveyor belt and/or the conveyor belt system.

Figure 7:
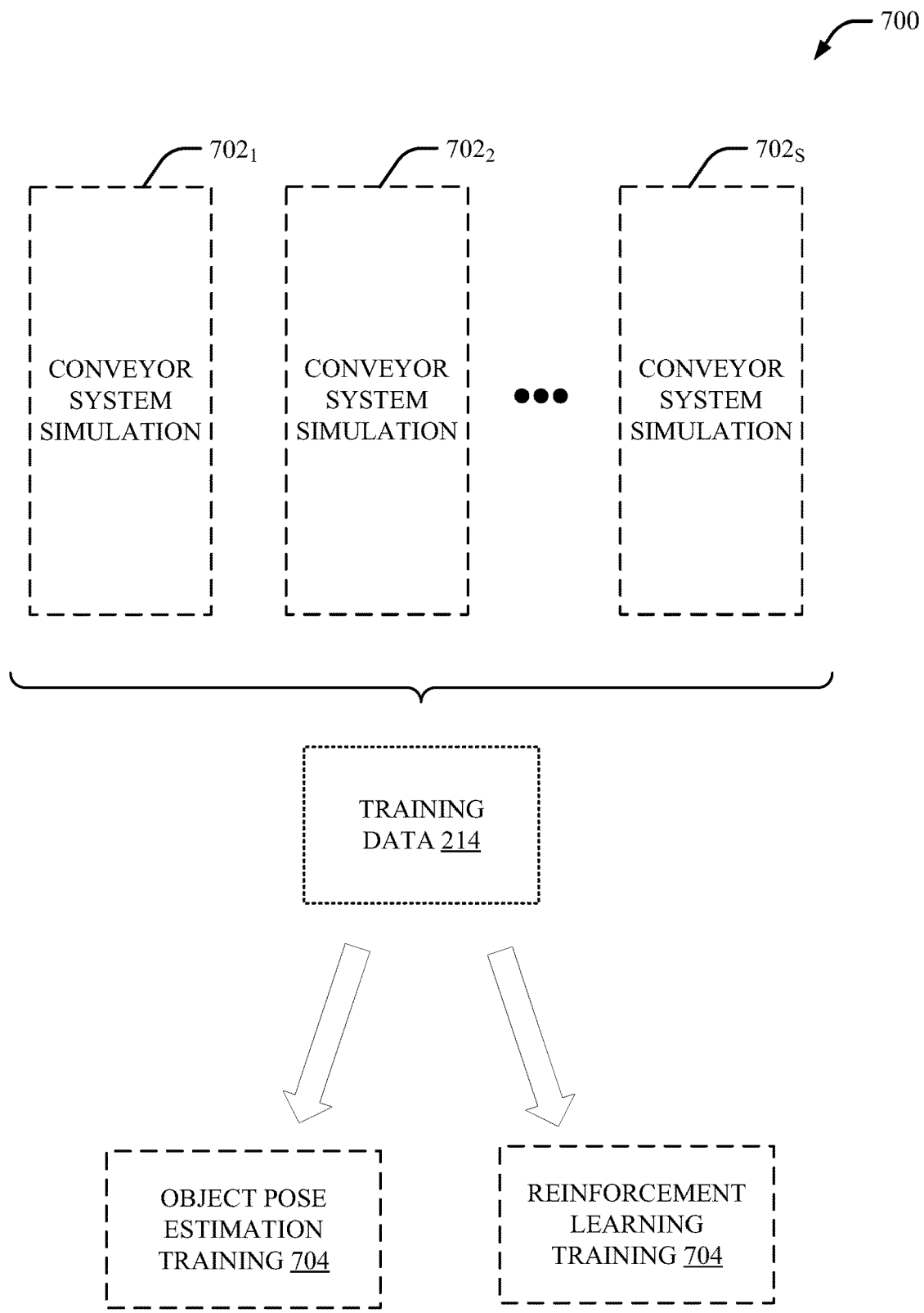
FIG. 7 illustrates a system associated with training to facilitate reinforcement learning based conveyoring control, in accordance with one or more embodiments described herein.

FIG. 7 illustrates a system 700 in accordance with one or more embodiments of the disclosure. The system 700 includes one or more training processes for training one or more machine learning models for object pose estimation and/or reinforcement learning. The system 700 includes one or more conveyor system simulations $702_{1-S}$, where S is an integer. In an embodiment, the one or more conveyor system simulations $702_{1-S}$ provide the training data 214. The training data 214 can be, for example, simulated data provided by the one or more conveyor system simulations $702_{1-S}$ configured in randomized environments. For example, the conveyor system simulation $702_1$ can transport one or more first objects with a first color via a conveyor belt of the conveyor system simulation $702_1$, the conveyor system simulation $702_2$ can transport one or more second objects with a second color via a conveyor belt of the conveyor system simulation $702_2$, etc. Additionally or alternatively, a vision system of the conveyor system simulation $702_1$ can be associated with a first depth noise, a vision system of the conveyor system simulation $702_2$ can be associated with a second depth noise, etc. Additionally or alternatively, the conveyor system simulation $702_1$ can include one or more first settings for a conveyor belt of the conveyor system simulation $702_1$, the conveyor system simulation $702_2$ can include one or more second settings for a conveyor belt of the conveyor system simulation $702_2$, etc. In certain embodiments, both simulated data and real data can be employed by the one or more conveyor system simulations $702_{1-S}$, where an amount of simulated data employed by the one or more conveyor system simulations $702_{1-S}$ is greater than an amount of real data employed by the one or more conveyor system simulations $702_{1-S}$ to, for example, minimize overfitting to only simulated data. In certain embodiments, a simulation-to-real-architecture associated with the one or more conveyor system simulations $702_{1-S}$ can employ domain randomization while training to, for example, minimize a gap between real data and simulated data.

In another embodiment, object pose estimation training 704 and reinforcement learning training 704 can be performed based on the training data 214. The object pose estimation training 704 can be associated with the object pose estimation training component 204 and the reinforcement learning training 704 can be associated with the reinforcement learning training component 206, in an embodiment. In certain embodiments, the object pose estimation training 704 can be performed, for example, in parallel to the reinforcement learning training 704. The object pose estimation training 704 can train, for example, a convolutional neural network (e.g., the convolutional neural network 502) for object pose estimation based on the training data 214. Furthermore, the reinforcement learning training 704 can determine one or more control policies and/or can train a machine learning model associated with reinforcement learning to actuate a conveyor belt based on the training data 214.

Figure 8:
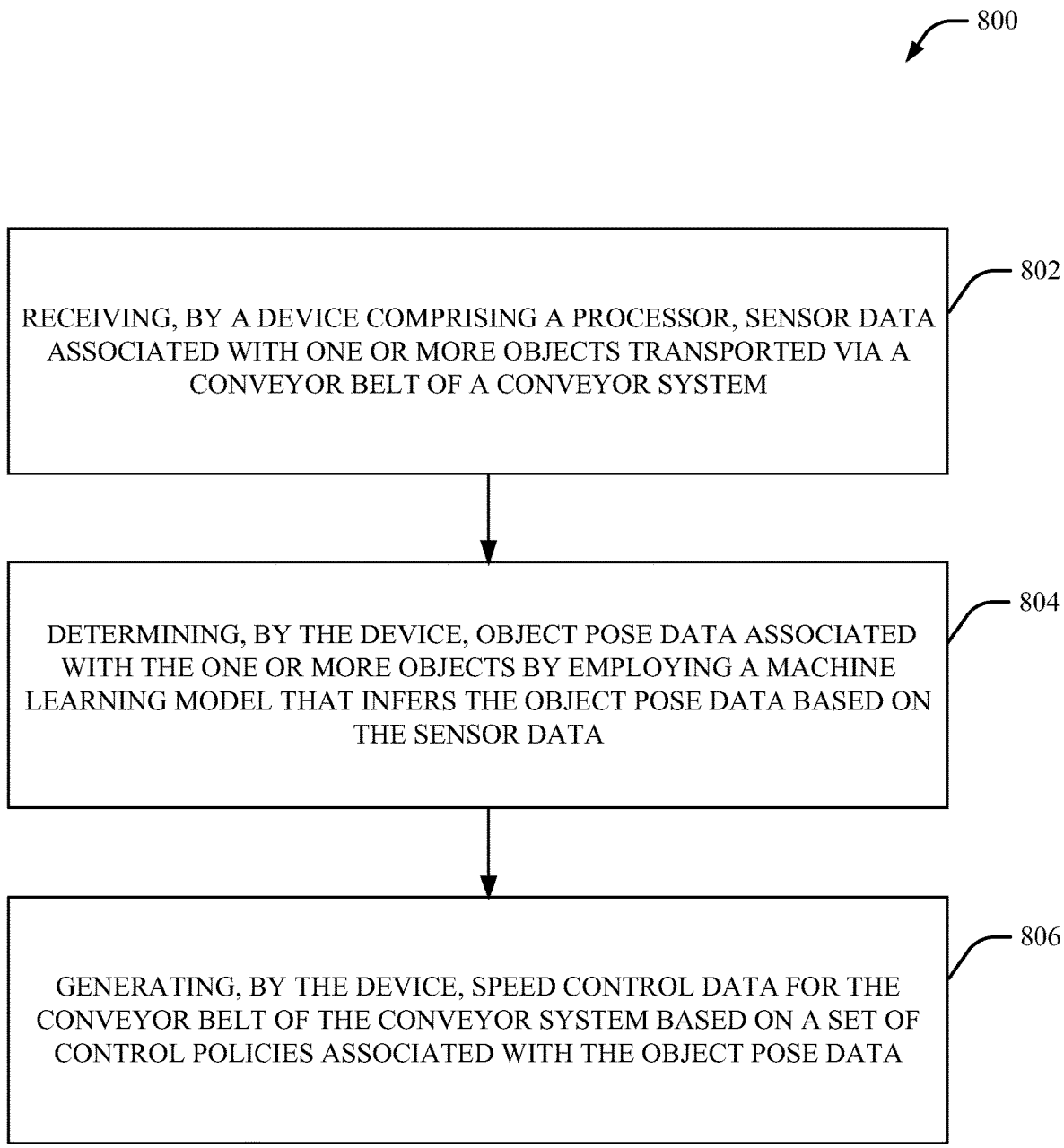
FIG. 8 illustrates a flow diagram for facilitating reinforcement learning based conveyoring control, in accordance with one or more embodiments described herein.

FIG. 8 illustrates a computer-implemented method 800 for facilitating reinforcement learning based conveyoring control in accordance with one or more embodiments described herein. The computer-implemented method 800 can be associated with the machine learning conveyor system 102, for example. In one or more embodiments, the computer-implemented method 800 begins with receiving, by a device comprising a processor (e.g., by the object pose estimation component 104), sensor data associated with one or more objects transported via a conveyor belt of a conveyor system (block 802). The sensor data can include one or more images (e.g., one or more 2D images and/or one or more 3D images) associated with the one or more objects. Additionally or alternatively, the sensor data can include 3D point cloud data associated with the one or more objects. In an embodiment, the sensor data can be imaging data that includes a plurality of pixels for the one or more images. For example, each pixel in the plurality of pixels can represent a point in a scene related to an object. In an embodiment, the one or more images of the sensor data can be one or more RGB images. The one or more objects can be one or more physical items, one or more elements, one or more devices, or the like that is transported via a conveyor belt of a conveyor system. For example, the one or more objects can be one or more packages, one or more parcels, one or more boxes, one or more cases, one or more cartons, one or more pallets and/or one or more other objects transported via a conveyor belt of a conveyor system in a material handling environment (e.g., a distribution center, a shipping center, a warehouse, a factory, etc.).

The computer-implemented method 800 further includes determining, by the device (e.g., by the object pose estimation component 104), object pose data associated with the one or more objects by employing a machine learning model that infers the object pose data based on the sensor data (block 804). In an embodiment, the machine learning model can be a convolutional neural network that infers the object pose data based on the sensor data. The convolutional neural network can be a deep neural network that is trained to analyze visual imagery for object pose estimation based on a shared-weights architecture and/or translation invariance characteristics between a series of convolutional layers, one or more pooling layers, one or more fully connected layers and/or one or more normalization layers. In another embodiment, the determining the object pose data comprises determining position data associated with the one or more objects based on the sensor data. The position data can include an x-axis position value, a y-axis position value, and/or a z-axis position value for each object from the one or more objects related to the sensor data. Additionally or alternatively, the determining the object pose data comprises determining orientation data associated with the one or more objects based on the sensor data. The orientation data can, for example, an orientation value for each object from the one or more objects related to the sensor data.

Furthermore, the computer-implemented method 800 includes generating, by the device (e.g., by the reinforcement learning component 106), speed control data for the conveyor belt of the conveyor system based on a set of control policies associated with the object pose data (block 806). The set of control policies can be one or more control policies generated for the conveyor belt of the conveyor system based on reinforcement learning. For example, the set of control policies can be one or more control policies to provide an optimal belt speed for the conveyor belt of the conveyor system. In an embodiment, the set of control policies can include one or more rules and/or one or more actions to facilitate an optimal belt speed for the conveyor belt of the conveyor system and/or mitigation of a jam condition associated with the conveyor belt of the conveyor system. The one or more rules and/or the one or more actions included in the set of control policies can be related to movement of the one or more objects from a certain area of the conveyor belt and/or the conveyor belt system. Additionally or alternatively, the one or more rules and/or the one or more actions included in the set of control policies can be related to a certain degree of forward movement or a certain degree of backward movement for the one or more objects with respect to the conveyor belt and/or the conveyor belt system. Additionally or alternatively, the one or more rules and/or the one or more actions included in the set of control policies can be related to a path of motion for the one or more objects with respect to the conveyor belt and/or the conveyor belt system. In certain embodiments, the speed control data can include a value to increase or decrease a current speed of the conveyor belt of the conveyor system. For example, the speed control data can include a certain positive value to increase a speed of the conveyor belt of the conveyor system by a certain amount. In another example, the speed control data can include a certain negative value to decrease a speed of the conveyor belt of the conveyor system by a certain amount. Additionally or alternatively, in certain embodiments, the speed control data can include a value to control a direction of the conveyor belt of the conveyor system. For example, the speed control data can include a certain value (e.g., a first binary value) to control direction of the conveyor belt of the conveyor system in a forward direction. In another example, the speed control data can include another value (e.g., a second binary value) to control direction of the conveyor belt of the conveyor system in a backward direction.

In certain embodiments, the computer-implemented method 800 further includes receiving, by the device (e.g., by the object pose estimation component 104), the sensor data from a vision system that scans the conveyor system. In certain embodiments, the machine learning model is a first machine learning model and the computer-implemented method 800 further includes generating, by the device (e.g., by the reinforcement learning component 106), the set of control policies based on a second machine learning model associated with reinforcement learning related to a plurality of conveyor systems. In certain embodiments, the computer-implemented method 800 further includes training, by the device (e.g., by the object pose estimation training component 204 and/or the reinforcement learning training component 206), the first machine learning model and/or the second machine learning model based on simulated data associated with the plurality of conveyor systems. In certain embodiments, the computer-implemented method 800 further includes providing, by the device (e.g., by the conveyor system control component 108), a control signal associated with the speed control data to an actuator of the conveyor system.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. A system, comprising:
   a conveyor system configured to transport one or more objects via a conveyor belt;
   a vision system that comprises one or more sensors configured to scan the one or more objects associated with the conveyor system; and
   a processing device configured to employ a machine learning model to determine object pose data associated with the one or more objects based on sensor data captured by the one or more sensors of the vision system, wherein the object pose data comprises a position and/or an orientation of each of the one or more objects with respect to the conveyor belt, and wherein the processing device is further configured to generate speed control data for the conveyor belt of the conveyor system based on a set of control policies associated with the object pose data, wherein the speed control data comprises a belt speed for the conveyor belt.

2. The system of claim 1, wherein the processing device is configured to employ a convolutional neural network to determine object pose data associated with the one or more objects.

3. The system of claim 1, wherein the processing device is configured to employ the machine learning model to determine position data associated with the one or more objects based on the one or more images associated with the one or more objects.

4. The system of claim 1, wherein the processing device is configured to employ the machine learning model to determine orientation data associated with the one or more objects based on the one or more images associated with the one or more objects.

5. The system of claim 1, wherein the processing device is configured to determine object pose data associated with the one or more objects based on RGB sensor data generated by the vision system.

6. The system of claim 1, wherein the machine learning model is a first machine learning model, and wherein the processing device is configured to generate the set of control policies based on a second machine learning model associated with reinforcement learning related to a plurality of conveyor systems.

7. The system of claim 6, wherein the second machine learning model is trained based on simulated data associated with the plurality of conveyor systems.

8. The system of claim 1, wherein the one or more objects is one or more first objects, wherein the conveyor system is a first conveyor system, and wherein the vision system scans the one or more first objects provided via the first conveyor system and one or more second objects provided via a second conveyor system.

9. The system of claim 1, wherein the processing device is configured to provide a control signal associated with the speed control data to an actuator of the conveyor system.

10. A computer-implemented method, comprising:
receiving, by a device comprising a processor, sensor data associated with one or more objects transported via a conveyor belt of a conveyor system;
determining, by the device, object pose data associated with the one or more objects by employing a machine learning model that infers the object pose data based on the sensor data, wherein the object pose data comprises a position and/or an orientation of each of the one or more objects with respect to the conveyor belt; and
generating, by the device, speed control data for the conveyor belt of the conveyor system based on a set of control policies associated with the object pose data, wherein the speed control data comprises a belt speed for the conveyor belt.

11. The computer-implemented method of claim 10, wherein the determining the object pose data comprises employing a convolutional neural network that infers the object pose data based on the sensor data.

12. The computer-implemented method of claim 10, wherein the determining the object pose data comprises determining position data associated with the one or more objects based on the sensor data.

13. The computer-implemented method of claim 10, wherein the determining the object pose data comprises determining orientation data associated with the one or more objects based on the sensor data.

14. The computer-implemented method of claim 10, further comprising:
receiving, by the device, the sensor data from a vision system that scans the conveyor system.

15. The computer-implemented method of claim 10, wherein the machine learning model is a first machine learning model, and wherein the computer-implemented method further comprises:
generating, by the device, the set of control policies based on a second machine learning model associated with reinforcement learning related to a plurality of conveyor systems.

16. The computer-implemented method of claim 11, further comprising:
training, by the device, the second machine learning model based on simulated data associated with the plurality of conveyor systems.

17. The computer-implemented method of claim 10, further comprising:
providing, by the device, a control signal associated with the speed control data to an actuator of the conveyor system.

18. A computer program product comprising at least one computer-readable storage medium having program instructions embodied thereon, the program instructions executable by a processor to cause the processor to:
receive sensor data associated with one or more objects transported via a conveyor belt of a conveyor system;
determine object pose data associated with the one or more objects by employing a machine learning model that infers the object pose data based on the sensor data, wherein the object pose data comprises a position and/or an orientation of each of the one or more objects with respect to the conveyor belt; and
generate speed control data for the conveyor belt of the conveyor system based on a set of control policies associated with the object pose data, wherein the speed control data comprises a belt speed for the conveyor belt.

19. The computer program product of claim 18, wherein the program instructions are executable by the processor to cause the processor to:
determine position data associated with the one or more objects based on the sensor data.

20. The computer program product of claim 18, wherein the program instructions are executable by the processor to cause the processor to:
determine orientation data associated with the one or more objects based on the sensor data.

* * * * *